J. GASSER.
BODY RAISING AND LOWERING MECHANISM FOR WAGONS.
APPLICATION FILED OCT. 12, 1920.
1,412,681.
Patented Apr. 11, 1922.
2 SHEETS—SHEET 1.
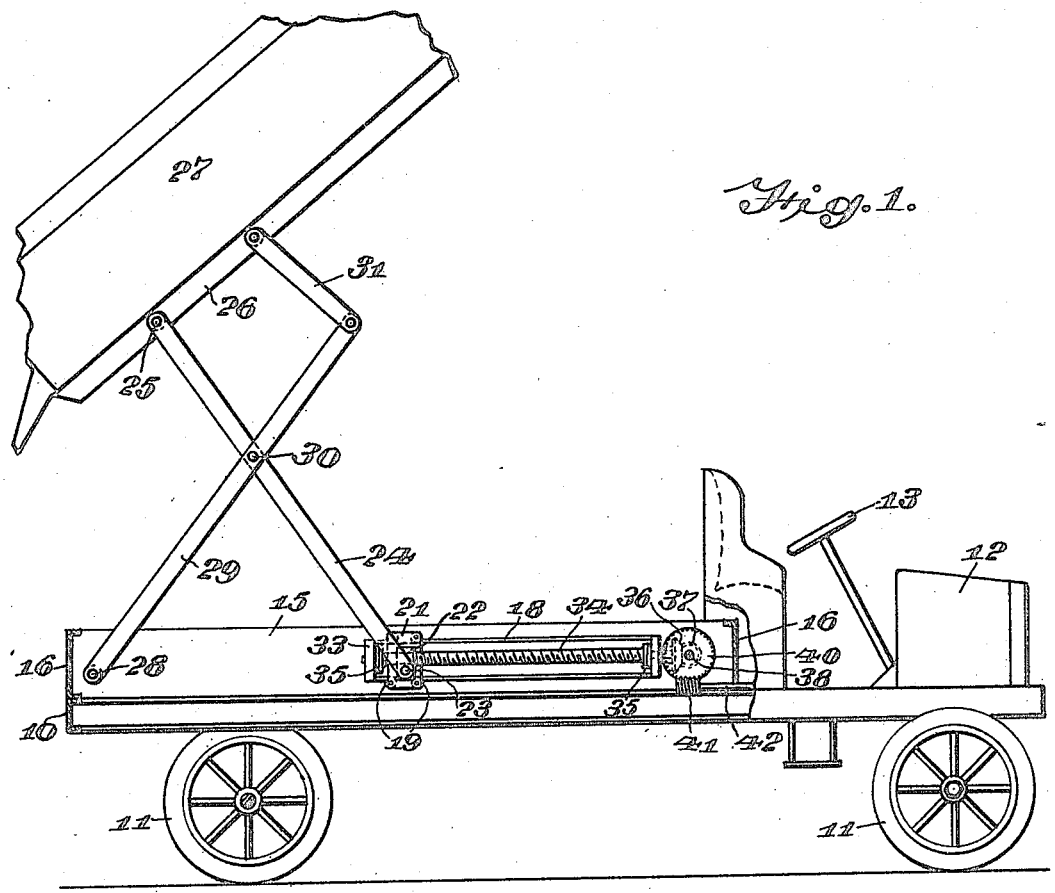
Joseph Gasser,
INVENTOR
BY *Victor J. Evans*
ATTORNEY
WITNESS: *Alfred Y. Bratton*

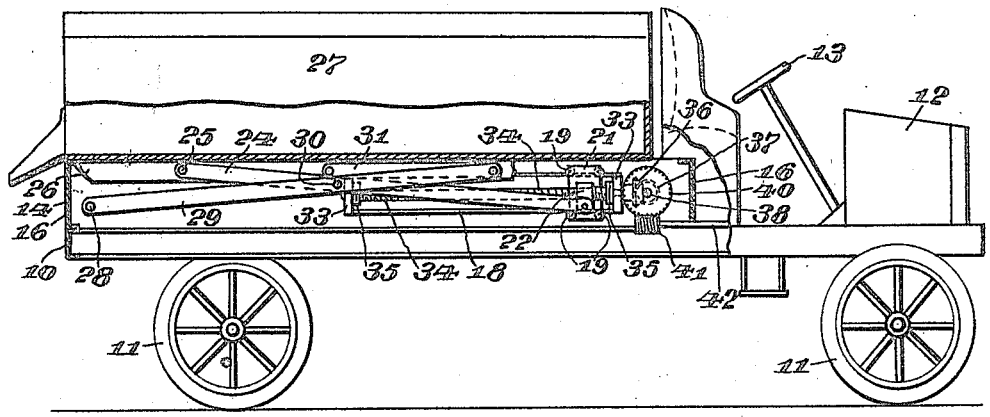
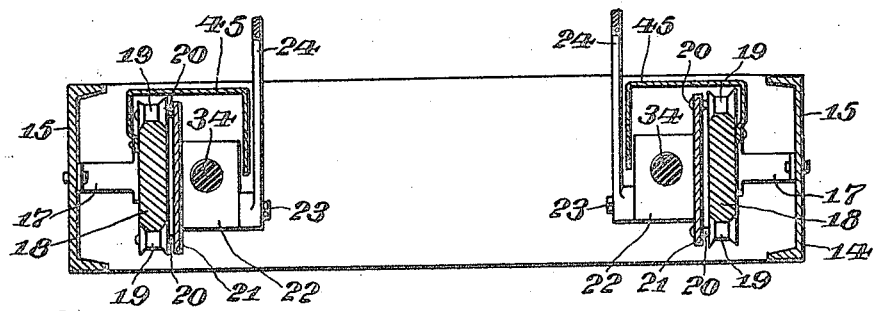
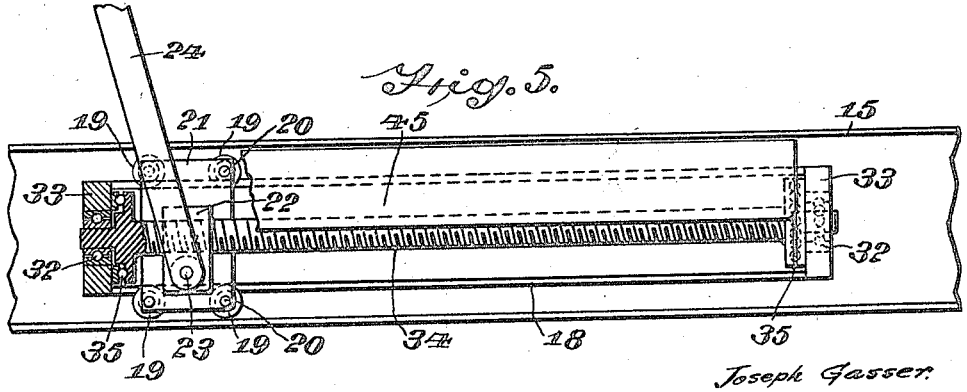

UNITED STATES PATENT OFFICE.

JOSEPH GASSER, OF TRENTON, NEW JERSEY.

BODY RAISING AND LOWERING MECHANISM FOR WAGONS.

1,412,681.  Specification of Letters Patent.  Patented Apr. 11, 1922.

Application filed October 12, 1920. Serial No. 416,451.

*To all whom it may concern:*

Be it known that I, JOSEPH GASSER, a citizen of the United States, residing at Trenton, in the county of Mercer and State of New Jersey, have invented new and useful Improvements in Body Raising and Lowering Mechanism for Wagons, of which the following is a specification.

This invention relates to wagons, trucks and the like and it has more particular reference to means for raising and lowering the body portions thereof into inclined or dumping position and vice versa.

The main object of my present invention is to provide a body raising and lowering mechanism for commercial vehicles or motor trucks having dumping or tiltable bodies.

Another object of this invention is to provide a body raising and lowering mechanism of the type referred to which is operated by the motor drive shaft, said mechanism being of simple construction, easily installed, cheap to manufacture, and very effective in operation.

With these and other minor objects in view as will later on be more apparent as the description proceeds, my invention consists essentially in the novel features of construction, combination and arrangement of parts hereinafter fully described and more specifically defined by the appended claims.

In the further disclosure of the invention, reference is to be had to the accompanying sheets of explanatory drawings constituting a part of this specification wherein like characters of reference designate the same or corresponding parts in all the views.

Figure 1— is a side elevation of a motor driven wagon having my invention applied thereto, the body or dump box being shown in inclined position and parts of the body and chassis broken away to better disclose the underlying structures.

Figure 2— is a plan of the same.

Figure 3— is a side elevation of the wagon with parts broken away or in section and showing the body or dump box in normal position.

Figure 4— is an enlarged transverse sectional detail showing the body or dump box raising and lowering mechanism and the means for supporting same relative to the truck chassis; and Figure 5— is a longitudinal elevation of the same.

In the drawings, the invention is shown as adapted more specifically to a motor propelled dumping wagon wherein the numeral 10 designates the chassis, 11 the wheels, 12 the engine or motor and 13 the steering mechanism. Mounted on the aforesaid chassis is a substantially rectangular frame 14 of channel or other appropriate section material, and comprising side members 15 and end members 16 suitably braced and connected at the meeting points. Supported in spaced relation to the side members 15 and on the inner faces thereof as by brackets 17, are guides or rails 18, the upper and lower edges whereof are fashioned as shown clearly in Figure 4, to constitute track-ways for anti-friction rollers 19 appropriately mounted on stub axles 20 projecting laterally from plate members 21 rigidly secured to or integral with threaded blocks or nuts 22. Pivotally connected to these blocks or nuts and on the inner faces thereof as by studs or pintles 23, are a pair of spaced forward arms 24, the upper ends whereof are pivoted on a cross bar or shaft 25 mounted in an appropriate channel frame or the like 26 secured beneath the underside of the body or dump box 27. Journaled on bearing bosses 28 on the inner faces of the side members 15 and preferably near the rear end thereof are a plurality of opposed or rear arms 29 which are pivotally connected— scissor fashion—at 30 to the aforesaid forward arms 24 and at their upper ends these rear arms 29 are hingedly connected by short links 31 to the underside of the frame 26. Now by reference to Figures 1 and 3 it will be readily seen that the front and rear bars or arms 24, 29, and links 31 constitute what may be termed a lazy-tong movement for raising the body or dump box 27 from its normal position to an inclined one for dumping.

Mounted in ball or roller bearings 32 in end brackets 33 integral with or adjoining the ends of each rail 18 is a screw threaded rod or shaft 34 on which are adapted to be traversed the aforesaid blocks or nuts 22, the latter being correspondingly threaded for this purpose, and it is to be particularly noted that each rod 34 is provided at both ends with a thrust bearing 35 so that relative ease in operation is effectively ensured.

Securely keyed or otherwise mounted on the forward end of each screw threaded rod or shaft 34, is a miter gear 36 in mesh with a corresponding gear 37 on a cross shaft 38 carried in appropriate bearings 39 in the frame 14, and it will therefore be apparent that by rotating the shaft 39, the gears 37, will actuate the gears 37 to rotate the screw threaded rods or shafts 34 and thereby traverse the blocks or nuts 22 either in a rearward or forward direction thereover.

Centrally of the cross shaft 38, I provide a worm wheel 40 in gear with and adapted for rotation by means of a worm gear 41 on the motor drive shaft 42, and it will be readily understood that any appropriate clutch mechanism may be fitted in conjunction therewith so that the raising and lowering mechanism need only be actuated as and when desired.

In order to provide an effective means for preventing dust and dirt from fouling the aforesaid screw threaded rods or shafts 34, I preferably mount thereover inverted channel shaped covers 45 of sheet metal or the like and which can be readily removed or fixed in place whenever requisite.

Now by reference to the views, it will be clearly apparent that when the body or dump box 27 is resting in the normal position upon the frame 26, and it is desired to raise and tilt said body or box 27 to empty the contents thereof, that said operation can be promptly effected by throwing in the clutch which couples up the worm gear 41 to the motor shaft 42 which will result in rotation of the cross shaft 38 which of necessity causes the screw threaded shafts or rods 34 to rotate under the action of the gears 37, 36. This rotation of the rods 34 will cause the blocks or nuts 22 to be traversed thereover, and, when so moved rearwardly relative to the truck body will bring about a raising of the front and rear arms 24, 29, respectively and thereby cause a tilting action to be given the body or dump box 27. Furthermore it is to be particularly noted that as the body or dump box 27 approaches its limit of upward movement or elevation that the links 31 will be rearwardly inclined relative to their pivotal points 44 on the rear arms 29 and thereby tend to further raise the forward end of the body or dump box 27 and thus effectively ensuring the proper gravitation of all the contents therefrom.

The rear end of the body or dump box is or may be provided with the customary chute under the control of an appropriate closure.

Obviously a reversal of the motor drive shaft 42 will result in the return of the body or dump box 27 to its normal position as shown in Figure 3.

Whilst I have described and shown my invention as more particularly applicable for motor driven vehicles it is to be understood that I do not limit myself thereto. Furthermore it will be readily seen that by my invention I provide an extremely simple and effective raising and lowering mechanism for bodies or dump boxes of any type of dumping vehicles, one that lifts to a maximum height and is readily collapsed or folded into a comparatively small space when in lowered position with nothing projecting beneath the supporting frame, and finally I wish it clearly understood that I do not confine myself to the precise structure and details shown and described.

One of the advantages of the construction illustrated is that the means for supporting and guiding the plates 21 carrying blocks 22 insures the proper operation of the device, since unequal or wrenching strains on the blocks, in a transverse direction, are practically eliminated, so far as any resulting harm is concerned, and a considerable portion of the weight of the load is taken off the screws.

Having described my invention what I claim as new and useful is:—

1. In a body raising and lowering mechanism for vehicles, the combination of a supporting frame and a body portion, longitudinally disposed tracks carried in said supporting frame, screw rods journaled in spaced relation to said tracks, blocks threaded on said screw rods means for guiding the blocks and preventing deflection due to unequal twisting strains, said means including plate members supporting the blocks and slidable along the sides of the tracks and rollers journaled on the plate members for engaging the upper and lower portions of the tracks, the axes of the rollers extending transversely of the flat surfaces of the plates, a toggle frame interposed between the supporting frame and the body portion, said toggle frame comprising forward arms, pivotally connected to the screw threaded blocks and rearward arms journaled on the supporting frame, and means for rotating the screw rods whereby the toggle frame is elevated or lowered.

2. In a body raising and lowering mechanism for vehicles the combination of a supporting frame and body portion, longitudinally disposed tracks carried by said supporting frame, anti-frictionally mounted screw rods having thrust bearings journaled in spaced relation longitudinally of said tracks, the blocks threaded on said screw rods means for guiding the blocks and preventing deflection due to unequal twisting strains, said means including plate members supporting the blocks and slidable along the sides of the tracks and rollers journaled on the plate members for engaging the upper and lower portions of the tracks, the axes of the rollers extending transversely of the flat surfaces of the plates, a toggle frame interposed between the supporting frame and the body portion, said toggle frame comprising forward arms pivotally connected to the screw threaded blocks and rearward arms journaled in the supporting frame, a covering shield disposed over each of the aforesaid screw rods, and means for rotating the screw rods whereby the toggle frame is elevated or lowered.

3. In a body raising and lowering mechanism for a motor vehicle including a drive shaft, the combination of a supporting frame and body portion, longitudinally disposed tracks carried by said supporting frame, anti-frictionally mounted screw rods having thrust bearings journaled in spaced relation longitudinally of said tracks, the blocks threaded on said screw rods and supported by anti-friction rollers on the tracks, relieving the blocks and screw rods in part of the weight of the body, a toggle frame interposed between the supporting frame and the body portion, said toggle frame comprising forward arms pivotally connected to the screw threaded blocks and rearward arms journaled in the supporting frame, a covering shield disposed over the aforesaid screw rods, pivoted links on the forward ends of the rear arms for tilting the body portion when raised, a worm shaft disposed transversely relative to the screw rods, spur gearing adapted to rotate said worm shaft, and screw rods in both directions, and means for operating the worm shaft direct from the motor drive shaft.

In testimony whereof I affix my signature.

JOSEPH GASSER.